United States Patent [19]  [11] 3,931,021
Lundberg  [45] Jan. 6, 1976

[54] METHOD FOR CONTROLLING VISCOSITY OF LUBRICATING OILS

[75] Inventor: Robert D. Lundberg, Somerville, N.J.

[73] Assignee: Exxon Research and Engineering Company, Linden, N.J.

[22] Filed: May 17, 1974

[21] Appl. No.: 470,806

[52] U.S. Cl. .................. 252/32.5; 252/32; 252/33; 252/35; 252/31; 252/41; 252/49.7
[51] Int. Cl.² ........................................... C01M 1/44
[58] Field of Search .......... 252/32, 32.5, 33, 35, 39, 252/41, 49.7

[56] References Cited
UNITED STATES PATENTS

| | | | |
|---|---|---|---|
| 2,449,025 | 9/1948 | Turner | 252/33 |
| 2,454,824 | 11/1948 | Moscowitz | 252/33 X |
| 2,638,445 | 5/1953 | Young et al. | 252/33 |
| 3,396,136 | 8/1968 | Dickerson | 252/33 X |
| 3,642,728 | 2/1972 | Canter | 260/79.3 R |
| 3,679,382 | 7/1972 | Cohrs et al. | 252/316 X |

*Primary Examiner*—Delbert E. Gantz
*Assistant Examiner*—Andrew H. Metz
*Attorney, Agent, or Firm*—Robert J. Baran

[57] ABSTRACT

The instant invention relates to a process for controlling the viscosity of organic liquids by incorporating in said liquid a minor amount of an ionic polymer, and a cosolvent for the ionic groups of said polymer. The ionic polymer comprises a backbone which is substantially soluble in said organic liquid, and pendant ionic groups which are substantially insoluble in said organic liquid. A cosolvent is selected which will solubilize the pendant ionomeric groups and provide a reasonably homogeneous mixture of solvent, cosolvent and ionomeric polymer. The preferred compositions prepared by the method of the instant invention comprise an organic liquid having a solubility parameter of from 6 to 10.5 in combination with a sulfonated polymer containing from 0.2 up to 10.0 mole % ionic groups which has been neutralized by a basic material selected from Groups IA and IIA, IB and IIB of the Periodic Table of the Elements (and also lead, tin and antimony) and a nonvolatile alcohol or amine cosolvent. In a most preferred embodiment, the solvent is a high boiling paraffinic type oil, the polymer is a sulfonated noncrystalline olefin copolymer, comprising from 0.3 to 3.0 weight percent sodium or potassium sulfonate groups, and a $C_6$ to $C_{12}$ alcohol, or $C_2$–$C_{12}$ glycol, or $C_3$–$C_{12}$ triol is used as the cosolvent.

38 Claims, No Drawings

METHOD FOR CONTROLLING VISCOSITY OF LUBRICATING OILS

FIELD OF THE INVENTION

The instant invention relates to a process for controlling the viscosity of organic liquids by incorporating in said liquid a minor amount of an ionic polymer, and a cosolvent for the ionic groups of said polymer. The ionic polymer comprises a backbone which is substantially soluble in said organic liquid, and pendant ionic groups which are substantially insoluble in said organic liquid. A cosolvent is selected which will solubilize the pendant ionomeric groups and provide a reasonably homogeneous mixture of solvent, cosolvent and ionomeric polymer. The preferred compositions prepared by the method of the instant invention comprise an organic liquid having a solubility parameter of from 6 to 10.5 in combination with a sulfonated polymer containing from 0.2 up to 10.0 mole % ionic groups which has been neutralized by a basic material selected from Groups IA and IIA, IB and IIB and also lead, tin and antimony of the Periodic Table of the Elements and a nonvolatile alcohol or amine as the cosolvent. In a most preferred embodiment, the solvent is a high boiling paraffinic type oil, the polymer is a sulfonated non-crystalline olefin copolymer, comprising from 0.3 to 3.0 mole percent sodium or potassium sulfonate groups, and a $C_6$ to $C_{12}$ alcohol, or $C_2$–$C_{12}$ glycol, or $C_3$–$C_{12}$ triol as the cosolvent.

BACKGROUND OF THE PRIOR ART

The rapid decrease in viscosity of liquids with increasing temperature is well known. Ideally, for many applications (automobile lubricants, etc.) it would be desirable to solve this problem so that liquid viscosity would be insensitive to temperature. Alternatively it might be desirable to provide liquid systems whose viscosities actually increase with temperature. To the best of our knowledge, neither of these goals have been accomplished in a reversible manner prior to this invention. It is true that with selected polymeric additives, it has been possible to reduce substantially the viscosity change with temperature which does occur with most oils and similar systems. These polymer additives, known as viscosity index improvers (or V.I. Improvers) are generally high molecular weight polymers.

The way in which these additives function can be summarized very briefly. In effect they perform two functions, i.e., thickening, which merely increases fluid viscosity; and Viscosity Index (V.I.) improvement, which corresponds to limited thickening at ambient temperatures and a correspondingly greater thickening at elevated temperatures. This can be accomplished by utilizing a polymeric additive which is poorly solvated by the liquid at ambient temperatures; however at elevated temperatures the polymer is more highly solvated such that the polymer expands and is a relatively more effective thickener.

While these V.I. Improvers have proven successful commercially, it is important to note that their effect at reducing viscosity changes with temperatures is rather mild. For a typical base oil containing a suitable V.I Improver the kinematic viscosity will still decrease by a factor of from 5 to 10 as the temperature increases from 30° to 100°C. Obviously, if it is desired to hold the viscosity roughly constant with such temperature changes, current technology has not offered an appropriate additive system.

U.S. Pat. No. 3,396,136 describes how copolymers of alkenyl aromatic sulfonic acids, when properly neutralized, can be employed as thickeners for non-polar solvents. Those metal sulfonate systems have been shown to be very effective; however, when employed as 2 component systems (i.e., ionic polymer plus non-polar solvent), the variation of viscosity with increased temperature is very conventional and predictable. That is, the solution viscosity decreases markedly as temperature is increased.

U.S. Pat. No. 3,396,136 further teaches "in situ" neutralization of the sulfonic acid polymer which under some conditions can result in the availability of a small amount of polar cosolvent—i.e., a solvent for the sulfonate groups about equal in amount to the amount of sulfonate groups which are present. This amount of polar cosolvent is not within the critical limits of the instant invention, which require amounts of the third component (which interacts with the ionomeric groups of the ionomer copolymer) at levels which range from 10 to 600 times the molar equivalence of ionic groups. This level of cosolvent is about one to two orders of magnitude or more higher than employed in the cited art. This amount of such cosolvent is required to obtain the unusual and unexpected viscosity-temperature behavior which is observed. In addition, the cited patent is restricted to aromatic sulfonate polymers. The instant invention describes other polymers such as sulfonated ethylene propylene terpolymers, sulfonated butyl, etc.

U.S. Pat. No. 3,666,430 teaches the gelling of organic liquids by the interaction of polar "associative bonds" which includes hydrogen bonding and "ionic crosslinking." Again this patent specifies that 2 components are necessary—the associating polymer (or polymers in some cases) and the non-polar organic liquid. There is no mention of a third polar cosolvent except to point out that such polar liquids should not be present. Specifically this patent states (Column 2, line 7) that the hydrocarbon liquids to which this invention is to be applied should not contain a substantial portion of a miscible protolytic liquid such as methanol. It is clear that the language of this patent limits this invention to gels and further that any amount of polar liquids which are present to an extent where they disrupt those gels are undesirable. The instant invention is distinct from that cited in that amounts of such polar compounds as will break up gel at ambient conditions are required, and in fact the most preferred state is free of any said gel at ambient temperatures.

U.S. Pat. No. 3,679,382 teaches the thickening of aliphatic hydrocarbons with synthetic organic polymers which contain olefinically unsaturated copolymerizable acids, amides, hydroxyacrylic esters, sulfonic acids, etc. It is emphasized in this patent (Column 3, line 72) that it is critical that in the preparation of such polymers no surface active agent, catalyst or other additive be employed which introduces a metallic ion into the system. Therefore it is preferred to employ ammonium or amine salts. It is clear that this invention (U.S. Pat. No. 3,679,382) specifically precludes the use of metallic counterions—and is directed towards amine or ammonium derivatives. Only metallic counterions are effective in the instant invention—and that, in fact, attempts to employ amine derivatives have not resulted in the results which are the objectives of this invention. Finally this cited patent does describe (Column 7, lines 13–19) that the addition of alcohols will reduce the viscosity of the thickened hydrocarbon and alter flow characteristics thereof.

SUMMARY OF THE INSTANT INVENTION

It is now unexpectedly discovered that the viscosity of organic liquids may be conveniently controlled by incorporating in said organic liquid a minor amount of the ionomeric polymer and a polar cosolvent. The ionomeric polymer is characterized as having a backbone which is substantially soluble in said organic liquid, and pendant ionic groups which are substantially insoluble in said organic liquid.

The number of ionic groups contained in the ionic polymer is a critical parameter affecting this invention. The number of ionic groups present in the polymer can be described in a variety of ways such as weight percent, mole percent, number per polymer chain, etc. For most polymer systems of interest in this invention, it is desirable to employ mole percent. For vinyl homopolymers, such as polystyrene, the sulfonated analog having a sulfonate content of 1.0 mole percent means that one out of every 100 monomer repeat units in the polymer chain is sulfonated. In the case of copolymers, the same definition applied, except for the purposes of this calculation the polymer can be considered to be prepared from a hypothetical monomer having an average molecular weight, which is the average of the two monomer components. Similarly for terpolymers the same averaging concepts apply, however three components are involved. For example, ethylene-propylene-ethylidene norbornene (ENB) is a preferred polymer backbone for this invention. A representative terpolymer would have a composition (weight percent) of 50% ethylene, 45% propylene and 5% ENB. This composition has an average repeat unit molecular weight of about 38.9. Thus, sulfonation of this composition, which occurs at the unsaturation of the ENB units to a level of 1.0 mole %, which means that in 38.9 gms (1 mole of average monomer repeat units) of this polymer, there would be present 0.01 mole of sulfonic acid groups. An alternate way of expressing this is to state the sulfonate level in terms of milli-equivalents of sulfonic acid groups per 100 gms of polymer. This latter procedure provides a rapid and independent measure of sulfonic acid content in a polymer through simple titration. This value is obtained from the above by simply stating the moles or equivalents of acid per 100 gms: $100/38.9 \times .01 = .0257$ or $1000 \times .0257 = 25.7$ milli-equivalents acid/100 gms of polymer.

Both mole percent sulfonate and milli-equivalent of sulfonate will be employed to describe the ionic polymers employed in this invention.

In general, the ionomeric polymer will comprise from 0.1 to 25 mole % pendant ionomeric groups, more preferably from 0.2 to 10 mole % pendant ionomeric groups. The ionic groups may be conveniently selected from the group consisting of carboxylate, phosphonate, and sulfonate, preferably sulfonate groups. The ionomers utilized in the instant invention are neutralized with the basic materials selected from Groups IA, IIA, IB, and IIB of the Periodic Table of the Elements (lead, tin, and antimony). Ionic polymers which are subject to the process of the instant invention are illimitable and include both plastic and elastomeric polymers. Specific polymers include sulfonated polystyrene, sulfonated t-butyl styrene, sulfonated polyethylene, sulfonated polypropylene, sulfonated styrene/acrylonitrile copolymers, sulfonated styrene/methyl methacrylate copolymers, sulfonated block copolymers of styrene/ethylene oxide, acrylic acid copolymers with styrene, sulfonated polyisobutylene, sulfonated ethylene-propylene terpolymers, sulfonated polyisoprene, and sulfonated elastomers and their copolymers.

Neutralization of the cited polymers with appropriate metal hydroxides, metal acetates, metal oxides etc. can be conducted by means well known in the art. For example, the sulfonation process as with butyl rubber containing a small 0.3 to 1.0 mole % unsaturation can be conducted in a suitable solvent such as toluene with acetyl sulfate as the sulfonating agent. The resulting sulfonic acid derivative can then be neutralized with a number of different neutralization agents such as sodium acetate, sodium ethoxide, sodium hydroxide, sodium phenolate and similar metal salts. The amounts of such neutralization agents employed will normally be equal stoichoimetrically to the amount of free acid in the polymer plus any unreacted reagent which still is present. It is preferred that the amount of neutralizing agent be equal to the molar amount of sulfonating agent originally employed plus 10% more to insure full neutralization. The use of more of such neutralization agent is not critical. Sufficient neutralization agent is necessary to effect at least 50% neutralization of the sulfonic acid groups present in the polymer, preferably at least 90%, and most preferably essentially complete neutralization of such acid groups should be effected.

The degree of neutralization of said ionomeric groups may vary from 50 to 500 mole % preferably 90 to 200%. Most preferably it is preferred that the degree of neutralization be substantially complete, that is with no substantial free acid present and without substantial excess of the base other than that needed to insure neutralization. Thus, it is clear that the polymers which are utilized in the instant invention comprise substantially neutralized pendant groups and, in fact, an excess of the neutralizing material may be utilized without defeating the objects of the instant invention.

The ionomeric polymers of the instant invention may vary in number average molecular weight from 1,000 to 10,000,000, preferably from 5,000 to 500,000, most preferably from 10,000 to 200,000. These polymers may be prepared by methods known in the art; for example, see U.S. Pat. No. 3,642,728, hereby incorporated by reference.

It is evident that the polymers covered within this invention encompass a broad class of hydrocarbon polymer systems. It is important that these hydrocarbon polymer backbones (in the absence of the ionic groups) be soluble in the organic liquid whose viscosity is to be controlled. To achieve the desired solubility it is required that the polymer to be employed possess a degree of polarity consistent with that solvent. This solubility relationship can readily be established by anyone skilled in the art simply by appropriate texts (e.g. Polymer Handbook, Edited by Brandrup and Immergut, Interscience Publishers, 1967, section IV-341). In the absence of appropriate polymer-solvent compatibility knowledge, this can be determined experimentally by observing whether the selected polymer will be soluble in the solvent at a level of 1 gm. polymer per 100 ml solvent. If the polymer is soluble, then this demonstrates that it is an appropriate backbone for modification with ionic groups to achieve the objectives of this invention. It is also apparent that polymers which are too polar will not be soluble in the relatively nonpolar organic liquids of this invention. Therefore, only those polymer backbones (i.e. as measured in the absence of ionic groups) having a solubility parameter less than 10.5 are suitable in this invention. This precludes the use of such polymers as polyvinyl alcohol, polyacrylonitrile etc. Also highly crystalline polymers are to be avoided since they tend not to be soluble in the relatively nonpolar organic liquids employed herein. Therefore acceptable polymers employed in this invention must possess a level of crystallinity of less than 25%. Thus, these acceptable polymers can be considered substantially noncrystalline.

The preferred ionic copolymers for use in the instant invention e.g. sulfonated polystyrene and substituted derivatives thereof, may be prepared by the procedures described in U.S. Ser. No. 294,489 filed on Oct. 2, 1972, in the names of H. S. Makowski, R. D. Lundberg, and G. H. Singhal, hereby incorporated by reference.

The ionomeric polymers may be incorporated into the organic liquid at a level of from 0.1 to 20 weight % preferably from 0.2 to 10 weight % most preferably from 0.5 to 5 weight % based on said organic liquid. Specific examples of preferred ionomeric polymers which are useful in the instant invention include sulfonated polystyrene, sulfonated poly-t-butyl styrene, sulfonated polyethylene, (substantially noncrystalline) and sulfonated polyethylene copolymers, sulfonated polypropylene (substantially noncrystalline), and sulfonated polypropylene copolymers, sulfonated styrene-methyl methacrylate copolymers, (styrene)-acrylic acid copolymers, sulfonated polyisobutylene, sulfonated ethylene-propylene terpolymers, sulfonated polyisoprene, sulfonated polyvinyl toluuene, and sulfonated polyvinyl toluene copolymers.

The ionomeric polymers of the instant invention may be prepared prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure. The neutralized polymer may then be isolated by means well known to those skilled in the art; i.e., coagulation, steam stripping, or solvent evaporation, because the neutralized polymer has sufficient thermal stability to be dried for empolyment at a later time in the process of the instant invention. It is well known that the unneutralized sulfonic acid derivatives do not possess good thermal stability and the above operations avoid that problem.

It is also possible to neutralize the acid form of these polymers in situ, however, this is not a preferred operation, since in situ neutralization requires preparation of the sulfonic acid in the organic liquid which is to be subjected to the instant process, or the acid form of the ionic polymer must be dissolved in said organic liquid. The former approach is impractical for many formulators, e.g., where viscosity control of oils (as defined below) is desirable; the latter approach may involve handling of an acid form of an ionic polymer which has limited thermal stability. Therefore, it is quite apparent that the preparation and isolation of a neutralized ionic polymer affords the maximum latitude in formulation, less problems in handling polymers of limited thermal stability, and maximum control over the final mixture of ionic polymer, polar cosolvent and organic liquid. The organic liquids, which may be utilized in the instant invention, are selected with relation to the ionic polymer and vice-versa. For example, the following preferred ionic polymers may be utilized to control the viscosity of the following organic liquids.

| Polymer | Organic Liquid |
| --- | --- |
| sulfonated polystyrene | benzene, toluene, ethyl benzene, methylethyl ketone, xylene, styrene, ethylene dichloride, methylene chloride |
| sulfonated poly-t-butylstyrene | benzene, toluene, xylene, ethyl benzene, styrene, t-butyl styrene, aliphatic oils, aromatic oils, hexane, heptane, decane, nonane, pentane |
| sulfonated ethylene-propylene terpolymer | aliphatic and aromatic solvents, oils such as Solvent 100Neutral", 150 Neutral" and similar oils, benzene, toluene, xylene, ethyl benzene, pentane, hexane, heptane, octance, iso-octane, nonane, decane |
| sulfonated styrene-methylmethacrylate copolymer | Aromatic solvents, ketone solvents, dioxane, halogenated aliphatics, e.g., methylene chloride, tetrahydrofuran |
| styrene-acrylic acid copolymers | Aromatic solvents, ketone solvents, tetrahydrofuran, dioxane, halogenated aliphatics, e.g., methylene chloride |
| sulfonated polyisobutylene | Saturated aliphatic hydrocarbons, diisobutylene, triisobutylene, aromatic and alkyl substituted aromatic hydrocarbons, chlorinated hydrocarbons, n-butyl ether, n-amyl ether, methyl oleate, aliphatic oils, oils predominantly paraffinic in nature and mixtures containing naphthenic hydrocarbons, Solvent 100 Neutral, Solvent 150 Neutral and all related oils, low molecular weight polymeric oils such as squalene, white oils and process oils having 60% or less aromatic content |
| sulfonated polyvinyl toluene | Toluene, benzene, xylene, cyclohexane, ethyl benzene, styrene, methylene chloride, ethylene dichloride. |

| Polymer | Organic Liquid |
|---|---|
| methylethyl ketone, methyl cyclohexane, oils containing at least 40% aromatic content by weight. | |

"Solvent 100 Neutral is a solvent extracted, neutral mineral lubricating oil having a viscosity at 100°F. of about 100 SUS.

*Solvent 150 Neutral is a solvent extracted, neutral mineral lubricating oil having a viscosity at 100°F. of about 150 SUS.

In general the organic liquid should possess a solubility parameter ranging from 6.0 to 10.5. Generally the ionic polymer will be derived from a polymer backbone having a solubility parameter within this range also.

Of particular interest in this invention as organic liquids to be thickened are lubricating oils.

The lubricating oil can be any fluid of low dielectric constant which does not chemically react with the ionic polymer or polar cosolvent. Fluids of lubricating viscosity generally have viscosities of from 35 to 50,000 SUS at 100°F. ($V_{100}$).

The fluid medium or oil may be derived from either natural or synthetic sources. Included among the hydrocarbonaceous oils are paraffin bases, naphthenic base and mixed base oils. Synthetic oils include polymer of various olefins, generally of from 2 to 6 carbon atoms, alkylated aromatic hydrocarbons, etc. Non-hydrocarbon oils include polyalkylene oxide, e.g., polyethylene oxide, silicones, etc. The preferred media are the hydrocarbonaceous media, both material and synthetic, particularly those intended for use as a crankcase lubricant. The lubricating fluid should meet the viscosity standards of the Society of Automotive Engineers Recommended Practice, SAEV 300a.

In lubricating fluids, it is often the practice to add additional components to perform certain functions, i.e., to increase oxidative stability, antioxidants are added. There are many such components. Such materials normally will not interfere with the purposes of the instant invention and at the normal level that they are employed, they can often be regarded as inert. However, there may be such additives which are within the constraints (i.e. solubility parameter) of the polar solvent. If so, those materials cannot be present at a higher level than that set for the polar cosolvent. Indeed such components can replace part of the polar cosolvent provided that they are within the aforementioned constraints.

The method of the instant invention includes incorporating a cosolvent, for example a polar cosolvent, into the mixture of organic liquid and ionomer, to solubilize the pendant ionomeric groups. The polar cosolvent will have a solubility parameter of at least 10.0, more preferably at least 11.0, and may comprise from 0.1 to 40, preferably .5 to 20 weight % of the total mixture of organic liquid, ionomeric polymer, and polar cosolvent.

In addition to the requirements for ionic polymer, organic liquid and polar cosolvent there is the additional and important constraint that the polar cosolvent be more polar than the organic liquid. This is required in order that the proper interaction between polar cosolvent and ionic groups obtain. If we designate the solubility parameter of the organic liquid as $S_L$ and the solubility parameter of the polar cosolvent as $S_p$, then we require that $$S_p \geq S_L + 1.0$$

In other words the polar cosolvent will be substantially more polar than the organic liquid to be thickened.

Normally the polar cosolvent will be a liquid at room temperature, however, this is not a requirement. It is required that the polar cosolvent be soluble or miscible with the organic liquid at the levels employed in this invention. Under normal circumstances, this miscibility requirement precludes the use of water as a polar cosolvent.

It should be noted that some of the prior art teachniques disclose systems wherein organic liquids were thickened by neutralized ionomers and in certain cases, for example see U.S. Pat. No. 3,396,136, cited above, wherein neutralization in situ with alcoholates inherently provided a very small amount of polar cosolvent in systems similar to those of the instant invention. However, it has now been discovered that polar cosolvent must be present in critical amounts of from 10 to 600 moles per mole of ionic group in order to give the desirable results of the instant invention and preferably from 20 to 400 moles per mole of ionic group. This amount is some 10 to 600 times greater than amounts employed in the cited patent. The criticality of these amounts is demonstrated below.

The method of the instant invention is especially useful for preparing systems wherein the viscosity may be reversibly controlled over broad temperature ranges. Thus, the polar cosolvent is chosen to be substantially non-volatile at the temperatures at which the compositions prepared by the instant method are utilized. In general, this means that alcohols and amines which are the preferred class of polar cosolvents will have a boiling point of at least 50°C. and more preferably, at least 80°C. Specific examples of polar cosolvent include

| | |
|---|---|
| Methanol | Ethylene glycol |
| Ethanol | Diethylene glycol |
| Propanol | Glycol |
| n-butanol | 1,4-butanediol |
| sec-butanol | Dimethyl phthalate |
| Isopropanol | Foramide |
| Pentanol | N-methyl formamide |
| Hexanol | Pyrrolidone |
| Benzyl alcohol | Propylene glycol |
| 2-ethyl hexanol | Butyrolactone |
| ethylamine | Dimethyl phosphite |
| Methylamine | N-ethyl acetamide |
| Dimethylamine | |

The compositions prepared by the method of the instant invention have unexpectedly different properties than the prior art systems which utilize ionomeric polymers, without a cosolvent to thicken organic liquids. For example, lightly sulfonated polystyrene (less than 0.5 metal sulfonate groups per 100 repeating units) is soluble in hydrocarbon liquids and behaves as a thickener. Higher sulfonate levels lead to gelled hydrocarbon liquids. However, the viscosity of such solutions or gels decrease markedly and monotonically with increasing temperature. In other words, the simple combination of a two-phase polymer such as polystyrene with a low level of sulfonate groups (from 0.1 to 5.0 mole %) appended, results in a true solution of a gel or a combination of these two states. The viscosity behavior of such liquids with change in temperature is unremarkable - in that one obtains an expected decrease in solubion viscosity with increasing temperature. This behavior is typical also of polymers which contain no ionic groups appended and is well known to those skilled in the art.

In the process of the instant invention the addition of a small but critical amount of a polar cosolvent, such as an alcohol, with the hydrocarbon liquid and the sulfonated polymer, results in a homogeneous solution but surprisingly, one in which the solution viscosity can:

a. be held virtually constant over a broad temperature range;
b. decrease only slightly as temperature increases;
c. actually increase as temperature increases.

The difference in viscosity behavior of such solutions when the polar cosolvent is present is unexpected, especially over the broad temperature ranges, observed. For example, in a system comprising 3% by weight sulfonated polystyrene (0.32 mole % sodium sulfonate) in xylene, the solution viscosity is observed to drop from 106 cps at 25°C. to 19.75 cps at 65°C. With the addition of 1.0% by weight of a polar cosolvent, i.e. hexanol the viscosity decreases from 109.6 cps at 65°C. to 79.4 cps at 25°C. By adjusting cosolvent content and/or polymer concentration the viscosity can be held nearly constant over a given temperature range. In the absence of the polar cosolvent the solution viscosity is observed to decrease monotonically as temperature increases.

The following theory is proposed for this unusual viscosity behavior, but there is no intent to be bound thereby. A multiphase polymer, can be defined as a system consisting of two or more phases which, in the bulk polymer are sufficiently incompatible to display two or more phases when studied by small angle X-ray scattering or a similar technique. Polystyrene containing 3 mole % sodium sulfonate groups, displays a continuous polystyrene phase with a sodium sulfonate phase dispersed therein and therefore meets the multiphase criteria. In the sodium sulfonate-polystyrene system, the polystyrene backbone is soluble in xylene as a representative hydrocarbon. The metal sulfonate groups, however, tend to aggregate strongly in xylene such that the system is simply a gel. The addition of a polar cosolvent, such as 1-hexanol, solvates the sulfonate groups very strongly and therefore in a mixed solvent (for example 90% xylene-10% 1-hexanol) the cited polymer is soluble. With a substantial amount of alcohol present, the viscosity-temperature behavior of this system is normal, decreasing rapidly with temperature. However, over a critical alcohol concentration range, the unexpected behavior of viscosity with temperature is observed (i.e., the viscosity either increases with increasing temperature or is relatively constant).

This behavior is consistent with the two polymer phases being solvated somewhat independently by the respective solvents. Thus, the polystyrene backbone will be solvated by xylene with approximately the same effectiveness across a wide temperature range. However, the solvation of the sulfonate groups can be expressed as follows:

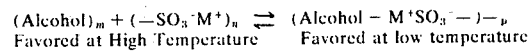

Favored at High Temperature    Favored at low temperature

It is believed that at higher temperatures the dissociation of the solvated sulfonate groups on the right side of the reaction occurs. The consequence of this is that at higher temperatures, increased interchain aggregation and a consequent increase in both polymer reduced viscosity and solution viscosity is observed.

It is clear that if this postulated equilibrium is correct, then the presence of higher levels of alcohol will essentially break up the interchain ionic aggregation. At very low levels of alcohol, there will be insufficient interaction to break up the ionic interaction to permit polymer dissolution. Similarly if the agent (such as the alcohol postulated in the equilibrium) does not solvate the polymer strongly enough again the polymer will not tend to dissolve adequately. Therefore, it is apparent that a relatively polar cosolvent is required.

The compositions prepared by the method of the instant invention have use as explosive compositions, fuels, pigment coatings, and lacquer coatings where viscosity control is important; and in hand soaps, explosives and greases, oils and other lubricants wherein viscosity index improvement is desirable.

The following are preferred embodiments of the instant invention.

EXAMPLE 1

Polymer solutions of 100% neutralized sodium sulfonated polystyrene were prepared in xylene-hexanol solvent mixtures at polymer concentrations of 1, 3 and 5 weight percent. The amount of hexanol present in xylene ranged over 0, 1, 3 and 5% levels. Solution of the polymer did not occur in all cases, and in those cases where homogeneous solutions were not obtained, no measurements were performed. For example, with a sodium sulfonate level of 1.98 mole percent in sulfonated polystyrene, a thick gel was obtained when only 1% hexanol was present. Brookfield viscosities of each solution were obtained with an LVT Brookfield viscometer at 25, 35, 50 and 65°C. As a control, a sample of polystyrene (3.0 weight percent) with a reduced viscosity of 0.8 was conducted in the same manner. Those results are shown in Table I:

TABLE I

| Viscosity (Centipoises) - Temperature Behavior of Polystyrene (Unmodified) | | |
|---|---|---|
| (3.0 weight percent polystyrene); Solvent: Xylene | | |
| 1-Hexanol Alcohol → Concentration | 0% | 3% |
| Temperature ↓ | | |
| 25°C | 3.28 | 3.26 |
| 35°C | 2.95 | 2.88 |
| 50°C | 2.48 | 2.44 |
| 65°C | 2.12 | 2.13 |

EXAMPLE 2

Following the procedure described above the viscosities of sodium sulfonated polystyrene were measured and the results are presented in Tables II and III.

TABLE II

VISCOSITY (CENTIPOISES) - TEMPERATURE BEHAVIOR OF SULFONATED POLYSTYRENE
(Na salt; 0.32 mole %)

Solvent: Xylene

| 1-Hexanol Concentration → | 5% | | | 3% | | | 1% | | | 0% | | |
|---|---|---|---|---|---|---|---|---|---|---|---|---|
| Polymer Concentration → | 5% | 3% | 1% | 5% | 3% | 1% | 5% | 3% | 1% | 5% | 3% | 1% |
| Temperature, °C. ↓ | | | | | | | | | | | | |
| 25 | 8.63 | 3.69 | 1.34 | 11.94 | 4.40 | 1.50 | 79.4 | 11.04 | 1.75 | INS | 106.0 | 1.87 |
| 35 | 7.64 | 3.28 | 1.27 | 11.25 | 4.08 | 1.27 | 89.6 | 10.64 | 1.42 | INS | 68.6 | 1.57 |
| 50 | 7.07 | 2.95 | 1.10 | 11.64 | 3.84 | 1.12 | 107.2 | 10.0 | 1.35 | INS | 38.3 | 1.37 |
| 65 | 6.66 | 2.58 | 0.86 | 11.75 | 3.60 | 0.95 | 109.6 | 8.7 | 1.04 | INS | 19.75 | 1.18 |

TABLE III

VISCOSITY (CENTIPOISES) - TEMPERATURE BEHAVIOR OF SULFONATED POLYSTYRENE
(Na Salt, 1.98 mole %)

Solvent: Xylene

| 1-Hexanol Concentration → | 5% | | | 3% | | | 1% | | |
|---|---|---|---|---|---|---|---|---|---|
| Polymer Concentration → | 5% | 3% | 1% | 5% | 3% | 1% | 5% | 3% | 1% |
| Temperature, °C. ↓ | | | | | | | | | |
| 25 | 304.8 | 26.65 | 1.42 | 2066 | 162.4 | 1.47 | INS | INS | INS |
| 35 | 316.8 | 25.90 | 1.19 | 2290 | 190.4 | 1.24 | INS | INS | INS |
| 50 | 418 | 32.85 | 1.05 | 3320 | 302.0 | 1.12 | INS | INS | INS |
| 65 | 618 | 44.45 | 0.93 | 5870 | 402 | 0.97 | INS | INS | INS |

(where INS denotes substantially insolubility). The results of Tables II and III contrast vividly with those of the polystyrene homopolymer in Table I. For example, with 3% hexanol and 5% polymer the sulfonated polymer shows almost no viscosity change from 25 to 65°C (in Table II). In contrast polystyrene viscosities drop by 25% with and without alcohol. Similarly the sulfonated polymer (Table II) without alcohol displays a marked decrease in viscosity. However, the same sulfonated polymer at 5% polymer concentration and 1% alcohol displays a 40% increase in viscosity over the same temperature range (Table II).

Note that when critical amounts of cosolvent, e.g., about 200 moles/mole ionic groups in Table II, column 4 or generally from 10 moles/mole ionic groups to 600 moles/mole ionic groups are utilized, the viscosity is approximately constant (within a factor of 2 or 3) over the temperature range studied.

TABLE IV

VISCOSITY (CENTIPOISES) - TEMPERATURE BEHAVIOR OF A SULFONATED t-BUTYL STYRENE-ISOPRENE COPOLYMER
(3.0 mole % Sodium Sulfonate)

| 1-Hexanol Concentration → | 4% | 2% | | 1% |
|---|---|---|---|---|
| Polymer Concentration | 4% | 6% | 4% | 4% |
| Temperature, °C. ↓ | | | | |
| 25 | 20.4 | 589 | 64 | 614 |
| 35 | 15.26 | 463 | 48.8 | 643 |
| 50 | 11.68 | 436 | 43.5 | 813 |
| 65 | 10.34 | 543 | 50.0 | 1120 |

Again it is apparent that when the polymer and alcohol are present in appropriate concentrations, it is possible to hold viscosity nearly constant (6% polymer concentration, 2% hexanol) or make it increase with increasing temperature (4% polymer concentration, 1% hexanol).

EXAMPLE 4

Preparation of lithium, sodium magnesium and diorthotolylguanidine salts of Sulfo EPT acid.

A sample of sulfonated ethylene-propylene terpolymer was prepared employing techniques well known in the art. The resulting polymer contained approximately 20 milli-equivalents of sulfonic acid per 100 grams polymer. Solutions of the acid were prepared by dissolving 30 gms of this polymer acid in 600 ml of a solvent composed of 570 ml benzene and 30 ml methanol. The temperature of the solution was kept at about 60°C. To prepare the appropriate salts:

A. Lithium salt: At 60°C. 21 ml of a solution of 5.1 gm lithium acetate . $2H_2O$ dissolved in a solution composed of 97 ml methanol plus 3 ml of water was added. This corresponds to an excess of 100% lithium acetate to insure complete neutralization. Good agitation was provided to ensure complete mixing in this and in the following experiments.

B. Sodium salt: In this case only 15 gms of polymer acid was dissolved in 600 ml of a solvent composed of 570 ml benzene and 30 ml methanol at 60°C. 21.5 ml of a solution prepared by dissolving 1 gm sodium acetate in 50 ml methanol was added to form the neutralized sodium salt (100% excess of sodium counterion).

C. Magnesium salt: At 60°C., 10.5 ml of a solution of magnesium acetate . $4H_2O$ (10.73 gms magnesium acetate . $4H_2O$ in 8 ml water + 92 ml methanol) was added. This corresponded to a 100% excess of magnesium acetate.

D. DOTG salt: To a solution of polymer acid 30 gms in 600 ml (570 ml benzene plus 30 ml methanol) was added 42 ml of a solution containing 5.98 gms DOTG in 100 ml of solvent comprised of 97 ml benzene and 3 ml methanol.

Each of the neutralized products was worked up by steam stripping the solution, finely subdividing the elastic crumb by high speed shearing of a methanol suspension of the crumb in a suitable blender, filtering the product, air drying the finely divided crumb in a hood overnight, and then drying the product in a vacuum oven at 50°C. The resulting products were analyzed to be

| Sample | Sulfur Content | Metal Content |
|---|---|---|
| A (Li) | 0.57% S | 0.15% Li |
| B Na | — | 0.51% Na |
| C Mg | 0.60% S | 0.33% Mg |
| D (DOTG) | 0.51% S | 0.66% N |

The samples described above were dissolved in xylene solvent or xylene-hexanol mixed solvents at various levels of polymer concentration and hexanol content. The solution viscosities were then measured using the Brookfield viscometer at various temperatures ranging from 0°C. to 100°C. and at various rotational speeds. The data are indicated in tables which correspond to the Li, Na, Mg and DOTG salts respectively. All viscosities are given in centipoises.

Table A

LITHIUM SALT OF SULFO-EPT

| Solvent Composition[a] | Polymer Concentration[b] | 0°C RPM's | 0°C Viscosity | 25°C RPM's | 25°C Viscosity | 50°C RPM's | 50°C Viscosity | 80°C RPM's | 80°C Viscosity | 100°C RPM's | 100°C Viscosity | 120°C RPM's | 120°C Viscosity |
|---|---|---|---|---|---|---|---|---|---|---|---|---|---|
| 100 xylene | 1.5 | .3 | 75,800 | .3 | 14,200 | | | | | | | | |
| | | | | .6 | 16,900 | | | | | 1.5 | 3,160+ | | |
| | | | | 1.5 | 20,000 | | | | | 3 | 3,140+ | | |
| | | | | | | 3 | 8,230+ | | | 6 | 3,560+ | | |
| | | | | | | | | 6 | 4,165+ | | | | |
| 99 xylene-1 hexanol | 3 | | | | | | | | | | | | |
| | | | | 1.5 | 16,800 | 1.5 | 20,800 | | | 1.5 | 29,360 | 1.5 | 24,400 |
| | | | | 3 | 16,000 | 3 | 19,760 | | | 3 | 28,400 | 3 | 23,600 |
| | | 6 | 5,000 | 6 | 15,940 | 6 | 19,180 | 6 | 18,400+ | | | | |
| 97 xylene-3 hexanol | 3 | | | | | .6 | 179 | .6 | 355 | .6 | 595 | | |
| | | 1.5 | 92.8 | 1.5 | 104.8 | 1.5 | 153.6 | 1.5 | 326 | | | | |
| | | 3 | 86 | 3 | 92.6 | 3 | 149 | | | | | | |
| 95 xylene 5 hexanol | 3 | 1.5 | 62 | | | | | 1.5 | 58.8 | 1.5 | 98.4 | 1.5 | 136 |
| | | 3 | 57.4 | 3 | 34.6 | 3 | 35 | 3 | 55.4 | 3 | 91 | 3 | 127 |
| | | 6 | 55.8 | 6 | 33.8 | 6 | 34.2 | 6 | 53.5 | 6 | 89.3 | | |

+ signifies that viscosity readings were erratic and tended to rise with time
[a] and [b] = by weight %.

Table B

SODIUM SALT OF SULFO-EPT

| Solvent Composition[a] | Concentration[b] | 0°C RPM's | 0°C Viscosity | 25°C RPM's | 25°C Viscosity | 50°C RPM's | 50°C Viscosity | 80°C RPM's | 80°C Viscosity | 100°C RPM's | 100°C Viscosity | 120°C RPM's | 120°C Viscosity |
|---|---|---|---|---|---|---|---|---|---|---|---|---|---|
| 100 xylene | 1.5 | 12 | 4400 | 12 | 4380 | 12 | 4170 | | | 12 | 5060 | 12 | 1440 |
| | | | | 30 | 3320 | 30 | 3840 | 30 | 3120 | 6 | 4400 | 30 | 1820 |
| 99 xylene-1 hexanol | 3 | | | .6 | 175,000 | .6 | 111,000 | 1.5 | 82,000 | 1.5 | 70,000 | 6 | 41,000 |
| | | | | 1.5 | 161,200 | 1.5 | 102,000 | | | 6 | 80,000 | | |
| | | 3 | 84,000 | 3 | 162,600 | 3 | 88,400 | | | | | | |
| 97 xylene-3 hexanol | 3 | | | | | 3 | 1330 | 3 | 2950 | 3 | 3620 | 3 | 2900 |
| | | 6 | 600 | 6 | 755 | 6 | 1310 | 6 | 2850 | 6 | 3535 | 6 | 2725 |
| | | 12 | 582.5 | 12 | 742.5 | 12 | 1280 | | | | | | |
| 95 xylene-5 hexanol | 3 | .6 | 188 | .6 | 166 | .6 | 207 | | | .6 | 600 | .6 | 768 |
| | | 1.5 | 158 | 1.5 | 143.2 | 1.5 | 184.8 | 1.5 | 387+ | | | | |
| | | 3 | 149 | 3 | 133.4 | 3 | 173.4 | | | | | | |

[a] and [b] = by weight %.
+signifies that viscosity readings were erratic and may have tended to increase with time Table C

MAGNESIUM SALT OF SULFO-EPT

| Solvent Composition[a] | Polymer Concentration[b] | 0°C RPM's | 0°C Viscosity | 25°C RPM's | 25°C Viscosity | 50°C RPM's | 50°C Viscosity | 80°C RPM's | 80°C Viscosity | 100°C RPM's | 100°C Viscosity | 120°C RPM's | 120°C Viscosity |
|---|---|---|---|---|---|---|---|---|---|---|---|---|---|
| 100 xylene | 1.5 | 3 | >400,000 | .6 | 85,400 | 1.5 | 14,800 | 12 | 6,500+ | 3 | 15,600+ | 6 | 10,700 |
| | | | | | | 3 | 16,000 | | | | | | |
| | | | | | | 6 | 18,400 | 6 | 13,500+ | | | | |

Table C-continued

MAGNESIUM SALT OF SULFO-EPT

| Solvent Composition[a] | Polymer Concentration[b] | 0°C RPM's | 0°C Viscosity | 25°C RPM's | 25°C Viscosity | 50°C RPM's | 50°C Viscosity | 80°C RPM's | 80°C Viscosity | 100°C RPM's | 100°C Viscosity | 120°C RPM's | 120°C Viscosity |
|---|---|---|---|---|---|---|---|---|---|---|---|---|---|
| 99 xylene-1 hexanol | 3 | 3 | 9,200 | .6 | 22,200 | 6 | 15,600+ | 1.5 | 43,000+ | .6 | 86,400+ | 3 | 144,000+ |
|  |  | 6 | 8,900 | 1.5 | 21,600 |  |  |  |  |  |  |  |  |
|  |  |  |  | 3 | 20,320 |  |  |  |  |  |  |  |  |
| 97 xylene 3 hexanol | 3 |  |  |  |  |  |  |  |  |  |  |  |  |
|  |  | 12 | 392.5 | 12 | 340 | 12 | 450 | 12 | 1575+ |  |  |  |  |
|  |  | 30 | 392 | 30 | 337 | 30 | 448 |  |  |  |  |  |  |
|  |  | 60 | 391 | 60 | 333.5 | 60 | 442.5 |  |  |  |  |  |  |
| 95 xylene-5 hexanol | 3 |  |  |  |  |  |  |  |  |  |  |  |  |
|  |  | .6 | 202 | .6 | 153 | .6 | 183 | .6 | 418 |  |  | 3 | 1670 |
|  |  | 1.5 | 182.8 | 1.5 | 140.8 | 1.5 | 157.6 | 1.5 | 386.8 |  |  | 6 | 1800 |
|  |  | 3 | 179 | 3 | 140 | 3 | 154.6 |  |  |  |  | 12 | 1784 |

[a] and [b] = by weight %.
+signifies that viscosity readings were erratic and may have tended to increase with time Table D

DOTG SALT OF SULFO-EPT

| Solvent Composition[a] | Polymer Concentration[b] | 0°C RPM's | 0°C Viscosity | 25°C RPM's | 25°C Viscosity | 50°C RPM's | 50°C Viscosity | 80°C RPM's | 80°C Viscosity | 100°C RPM's | 100°C Viscosity | 120°C RPM's | 120°C Viscosity |
|---|---|---|---|---|---|---|---|---|---|---|---|---|---|
| 100 xylene | 1.5 |  |  |  |  |  |  |  |  |  |  |  |  |
|  |  | .6 | 550 | .6 | 160 |  |  |  |  |  |  |  |  |
|  |  |  |  | 1.5 | 142 |  |  |  |  |  |  |  |  |
|  |  |  |  | 3 | 138.6 | 3 | 50 | 6 | 18.7 | 6 | 10.9 | 12 | 7.05 |
|  |  |  |  |  |  | 6 | 48.2 | 12 | 17.85 | 12 | 10.65 | 30 | 6.80 |
|  |  |  |  |  |  | 12 | 47.7 | 30 | 17.56 | 30 | 10.52 | 60 | 6.85 |
| 99 xylene-1 hexanol | 3 |  |  |  |  |  |  |  |  |  |  |  |  |
|  |  | 1.5 | 122.4 | 1.5 | 67.2 |  |  |  |  |  |  |  |  |
|  |  | 3 | 118.2 | 3 | 65.0 | 3 | 32.6 |  |  |  |  |  |  |
|  |  |  |  | 6 | 62 | 6 | 32.3 | 6 | 15.6 |  |  |  |  |
|  |  |  |  |  |  | 12 | 30.75 | 12 | 15 | 12 | 9.1 | 12 | 6.65 |
|  |  |  |  |  |  |  |  | 30 | 14.64 | 30 | 9.0 | 30 | 6.70 |
|  |  |  |  |  |  |  |  |  |  | 60 | 9.15 | 60 | 6.60 |
| 97 xylene-3 hexanol | 3 |  |  |  |  |  |  |  |  |  |  |  |  |
|  |  | 3 | 59.4 | 3 | 38 | 3 | 24 |  |  |  |  |  |  |
|  |  | 6 | 57.2 | 6 | 37.3 | 6 | 23 | 6 | 13.2 |  |  |  |  |
|  |  |  |  | 12 | 36.85 | 12 | 22 | 12 | 12.75 | 12 | 8.95 | 12 | 7.00 |
|  |  |  |  |  |  |  |  | 30 | 12.46 | 30 | 8.74 | 30 | 6.26 |
|  |  |  |  |  |  |  |  |  |  | 60 | 8.76 | 60 | 6.27 |
| 95 xylene-5 hexanol | 3 |  |  |  |  |  |  |  |  |  |  |  |  |
|  |  | 3 | 58.4 | 3 | 30 |  |  |  |  |  |  |  |  |
|  |  | 6 | 55.7 | 6 | 29.8 | 6 | 19 | 6 | 11.7 |  |  |  |  |
|  |  |  |  | 12 | 28.65 | 12 | 18.15 | 12 | 11.6 | 12 | 8.35 | 12 | 6.30 |
|  |  |  |  |  |  | 30 | 17.84 | 30 | 11.2 | 30 | 8.00 | 30 | 6.30 |
|  |  |  |  |  |  |  |  |  |  | 60 | 8.04 | 60 | 6.15 |

[a] + [b] = by weight %.

EXAMPLE 5

Viscosity Control of Oils

A sample of ethylene propylene terpolymer was sulfonated and neutralized to form the sodium salt in a manner analogous to that described previously and also as well known in the art. The sulfur analysis of the neutralized product was 0.58% S. This corresponds roughly to about 18 milli-equivalents of metal sulfonate (or sulfonic acid moiety) per 100 grams of polymer.

The resulting polymer in dried form was dissolved in a number of solvents in which the major component was a paraffinic based oil widely known as Solvent 150N. To this base stock a number of different alcohols were combined at various levels ranging from about 1% up to about 10%. The polymer was dissolved in these mixed solvents at various levels ranging from about 1% up to 3%. Sufficient time was permitted with agitation to achieve dissolution.

The viscosity of these resulting solutions was then measured by means of a Brookfield Viscometer at various rotation speeds and at various temperatures. All concentrations given are by weight %.

For comparison the viscosity of the base oil Solvent 150N, Esso Extra, Esso 20W-20 oil, Shell Super X (10W-50 multigrade oil), Solvent 100 Neutral and solutions of ethylenepropylene terpolymer dissolved in Solvent 150N or Solvent 150N containing 10% alcohol were also measured as standard of comparison. The viscosity values at several different shear rates at various rotational speeds are presented in Tables E-G.

The polymer employed, unless otherwise indicated is the sulfo EPT described above. The alcohols employed were hexanol, decanol, benzyl alcohol. The righthand column indicated as → 25°C. illustrates the viscosity value obtained at 25°C. after exposure to the high temperature range of up to 150°C. and may be slightly different from the value obtained initially at 25°C. due to a slight loss of polar cosolvent or oil due to the extreme thermal abuse. For the most part the values obtained after this thermal cycle do not differ substantially from the initial values, demonstrating the reversibility of the phenomenon.

The extreme right column reveals a ratio of the viscosity at 100°C. divided by the viscosity at 25°C. abbreviated as RATIO. Wherever possible this ratio is determined at the same shear rates, or if that is not feasible, the value is determined at shear rates which are as similar as possible.

The data in Tables E-G reveal that conventional oils such as Solvent 100N and 150N retain about 10% of their 25°C. viscosity at 100°C. Actually this value is somewhat deceiving since the viscosity values become so low (3.5 to 6.5 cps) that further viscosity losses become physically very difficult as the values become progressively lower at 100°C.

A more relevant comparison is that of practical motor oils as exemplified by Esso Extra 10W-20W-30 and Esso 20W-20. These specially formulated oils retain from 6% to 7.2% of their 25°C. viscosity at 100°C. One recently commercialized multigrade oil, Shell Super X, widely claimed to retain viscosity at high temperature is shown to retain about 7.8% of its 25°C. viscosity at 100°C.

It is indeed dramatic that the oils composed of sulfo EPT, a suitable base stock (150N) and small amounts of polar cosolvent are demonstrated to retain up to 24% of their 25°C. viscosity at 100°C. It is clearly evident (for example, Sample A of Table E) that are higher temperatures the viscosity retention ratio is even higher — a value of 31% being realized at 150°C.

These results also demonstrate that, as the ratio of alcohol to sulfonate groups is increased, the ability to retain a relatively high ratio is reduced if one considers the ratio of $$\frac{100°C.}{25°C}$$

however, the consideration of viscosity for these samples at even higher temperatures such as $$\frac{150°C.}{25°C}$$

demonstrates that the unusual viscosity phenomenon is still manifested. However, if the alcohol to sulfonate content is increased such the molar ratio of alcohol to metal sulfonate exceeds 600 the magnitude of the phenomenon is sufficiently reduced to be of little interest.

EXAMPLE 6

Utilizing the same Sulfo-EPT polymer described in the previous example, similar experiments were conducted employing Solvent 100 Neutral as the hydrocarbon liquid. The results are shown in Table (H). Again the ratio of the viscosity at 100°C. to that at 25°C. is provided. It is apparent that the values of this ratio for the specific systems described there runs from 0.14 up to the very high value of 0.41. In contrast, less than one-tenth of the 25°C. viscosity of 100N is observed at 100°C.

Table E

| Sample | SULFO-EPT (Na SALT, 0.58% S), IN SOLVENT 150 N | | | | | | | | |
|---|---|---|---|---|---|---|---|---|---|
| | 0°C | | 25°C | | 50°C | | 80°C | | 100°C |
| | RPM | Viscosity | RPM | Viscosity | RPM | Viscosity | RPM | Viscosity | Viscosity |
| 3% Polymer 5% Hexanol | .6 | 12,500 | .6 | 2,000 | | | | | |
| | 1.5 | 11,140 | 1.5 | 2,000 | 1.5 | 640 | | | |
| | | | 3 | 2,000 | 3 | 600 | 3 | 270 | |
| | | | 6 | 2,025 | 6 | 600 | 6 | 300 | 375 |
| | | | 12 | 1,960 | 12 | 610 | 12 | 307.5 | 385 |
| | | | | | 30 | 604 | 30 | 310 | 362 |
| | | | | | | | 60 | 311.5 | 377.5 |
| 3% Polymer 10% Hexanol | 1.5 | .900 | | | | | | | |
| | 3 | .730 | 3 | 1,120 | | | | | |
| | | | 6 | 1,125 | 6 | 325 | 6 | 125 | |
| | | | 12 | 1117.5 | 12 | 330 | 12 | 125 | 82.5 |
| | | | | | 30 | 335 | 30 | 128 | 85 |
| | | | | | 60 | 335 | 60 | 132.5 | 87.5 |
| 1% Polymer 2.5% Hexanol | .6 | 680 | .6 | 167 | .6 | 60 | | | |
| | | | 1.5 | 153.6 | 1.5 | 50.8 | 1.5 | 24 | |
| | | | 3 | 147.6 | 3 | 49.0 | 3 | 22 | 14.4 |
| | | | | | 6 | 49.3 | 6 | 22.1 | 14.2 |
| | | | | | 12 | 48.2 | 12 | 21.75 | 14.2 |
| | | | | | | | 30 | | 14.1 |
| 1% Polymer 1.66% Hexanol 1.60 | .3 | 710 | .3 | 176 | | | | | |
| | .6 | 697 | .6 | 162 | .6 | 62 | | | |
| | | | 1.5 | 154.8 | 1.5 | 54.4 | 1.5 | 26.5 | |
| | | | 3 | 154.6 | 3 | 53.4 | 3 | 25 | 16.8 |
| | | | | | 6 | 54.5 | 6 | 25 | 16.8 |
| | | | | | | | 12 | 24.75 | 16.7 |
| 1% Polymer 1% Hexanol | .3 | 900 | .3 | 228 | | | | | |
| | .6 | 867 | .6 | 208 | .6 | 83 | | | |

Table E-continued

SULFO-EPT (Na SALT, 0.58% S), IN SOLVENT 150 N

| Sample | 0°C RPM | Viscosity | 25°C RPM | Viscosity | 50°C RPM | Viscosity | 80°C RPM | Viscosity | 100°C RPM | Viscosity |
|---|---|---|---|---|---|---|---|---|---|---|
| | | | 1.5 | 204.8 | 1.5 | 74.0 | 1.5 | 40 | | |
| | | | 3 | 196 | 3 | 72.4 | 3 | 37.4 | 3 | 23.5 |
| | | | | | 6 | 71.3 | 6 | 35.7 | 6 | 23.0 |
| | | | | | | | 12 | 34.25 | 12 | 21.85 |
| | | | | | | | | | 30 | 19.84 |
| Solvent 150 N | .6 | 242 | .6 | 65 | | | | | | |
| | 1.5 | | 1.5 | 54.4 | 1.5 | 20.8 | | | | |
| | | 25.2 | | | | | | | | |
| | | | 3 | 51.2 | 3 | 18 | | 7.8 | 3 | 6 |
| | | | 6 | 50.3 | 6 | 17.2 | 6 | 7.6 | 6 | 6.4 |
| | | | | | 12 | 16.9 | 12 | 7.0 | 12 | 5.4 |
| | | | | | 30 | 16.8 | 30 | 6.84 | 30 | 4.73 |
| | | | | | | | 60 | 6.89 | 60 | 4.56 |
| 2% Polymer 1% Benzyl Alcohol | .6 | 728 | .6 | 175 | .6 | 75 | | | | |
| | | | 1.5 | 164 | 1.5 | 60 | 1.5 | 30 | | |
| | | | 3 | 160.2 | 3 | 57.4 | 3 | 27.2 | 3 | 17 |
| | | | | | 6 | 57.3 | 6 | 27.2 | 6 | 16.4 |
| | | | | | | | 12 | 26.9 | 12 | 16.0 |
| | | | | | | | | | 30 | 15.9 |
| 2% Polymer 2% Benzyl Alcohol | | | .3 | 510 | .3 | 190 | .3 | 128 | .3 | 138 |
| | | | .6 | 500 | .6 | 178 | .6 | 119 | .6 | 132 |
| | 1.5 | | | | 1.5 | 173.6 | 1.5 | 111.2 | 1.5 | 124 |
| | | .520 | | | | | | | | |
| | 3 | | | | 3 | 171.2 | 3 | 111.6 | 3 | 122 |

| Sample | 120°C RPM | Viscosity | 135°C RPM | Viscosity | 150°C RPM | Viscosity | →25°C RPM | Viscosity | Ration |
|---|---|---|---|---|---|---|---|---|---|
| 3% Polymer 5% Hexanol | | .500 | | | | | | | 0.185 |
| | | | | | | | 1.5 | 2,460 | |
| | 3 | 400 | 3 | 500 | 3 | 620 | 3 | 2,330 | |
| | 6 | 410 | 6 | 500 | 6 | 615 | 6 | 2,235 | |
| | 12 | 405 | 12 | 500 | 12 | 617.5 | 12 | 2157.5 | |
| | 30 | 396 | 30 | 493 | 30 | 597 | | | |
| | 60 | 391 | 60 | 481 | | | | | |
| 3% Polymer 10% Hexanol | | | | | | | | | .073 |
| | | | | | | | 1.5 | 1,260 | |
| | | | | | | | 3 | 1,230 | |
| | | | | | | | 6 | 1,210 | |
| | 12 | 62.5 | 12 | 60 | 12 | 62.5 | 12 | 1,170 | |
| | 30 | 73 | 30 | 63 | 30 | 65 | | | |
| | 60 | 67.5 | 60 | 62.5 | 60 | 66 | | | |
| 1% Polymer 2.5% Hexanol | | | | | | | | | .098 |
| | | | | | | | .6 | 143 | |
| | | | | | | | 1.5 | 131.2 | |
| | 3 | 10.0 | 3 | 8.4 | | | 3 | 133.4 | |
| | 6 | 10.0 | 6 | 8.0 | 6 | 6.20 | | | |
| | 12 | 9.9 | 12 | 7.85 | 12 | 6.35 | | | |
| | 30 | 10 | 30 | 8.0 | 30 | 6.54 | | | |
| 1% Polymer 1.66% Hexanol 1.60 | | | | | | | .3 | 210 | .109 |
| | | | | | | | 1.5 | 188 | |
| | | | | | | | .6 | 174.8 | |
| | 3 | | 3 | 10.4 | | | .3 | 168 | |
| | 6 | 11.6 | 6 | 9.7 | 6 | 7.8 | | | |
| | 12 | 11.6 | 12 | 9.35 | 12 | 7.15 | | | |
| 1% Polymer 1% Hexanol | | | | | | | .3 | 230 | .12 |
| | | | | | | | .6 | 215 | |
| | | | | | | | 1.5 | 198.6 | |
| | 3 | 16.4 | 3 | 12.0 | | | 3 | 192 | |
| | 6 | 15.2 | 6 | 11.5 | 6 | 9.20 | | | |
| | 12 | 14.3 | 12 | 10.9 | 12 | 8.65 | | | |
| | 30 | 13.34 | 30 | 10.12 | 30 | 8.14 | | | |
| | | | (140°C) | | | | | | |
| Solvent 150 N | | | | | | | | | .118 |
| | 6 | 4.5 | 6 | 3.3 | | | | | |
| | 12 | 3.8 | 12 | 2.8 | | | | | |
| | 30 | 3.26 | 30 | 2.44 | | | | | |
| | 60 | 3.13 | 60 | 2.32 | | | | | |
| 2% Polymer 1% Benzyl Alcohol | | | | | | | | | .106 |
| | 3 | 11 | | | | | | | |
| | 6 | 11 | 6 | 8.60 | | | | | |
| | 12 | 11 | 12 | 8.50 | | | | | |
| | 30 | 11.2 | 30 | 8.50 | | | | | |
| 2% Polymer 2% Benzyl Alcohol | .3 | 230 | .3 | 180 | | | | | .27 |
| | .6 | 197 | .6 | 165 | | | | | |
| | 1.5 | 178 | 1.5 | 156 | | | | | |
| | 3 | 174.8 | 3 | 150 | | | | | |

Table F

SULFO-EPT (Na SALT, 0.58% S) IN SOLVENT 150N

| Sample | 0°C RPM | 0°C Viscosity | 25°C RPM | 25°C Viscosity | 50°C RPM | 50°C Viscosity | 80°C RPM | 80°C Viscosity | 100°C RPM | 100°C Viscosity | 120°C RPM | 120°C Viscosity | 135°C RPM | 135°C Viscosity | Ratio |
|---|---|---|---|---|---|---|---|---|---|---|---|---|---|---|---|
| 2% Polymer 3% Benzyl Alcohol | | | .6 | 507 | .6 1.5 3 | 160 150 148 | .6 1.5 3 6 | 96 78 74 74.4 | 1.5 3 6 | 74 69.4 68.9 | .6 1.5 3 70.7 | 77 72 70.4 | | | .146 |
| 2% Polymer 4% Benzyl Alcohol | | | .6 | 511 | .6 1.5 3 | 145 134.8 131 | .6 1.5 3 6 | 60 54.4 54.4 53.8 | 1.5 3 6 12 | 48 42.6 41.9 41.65 | 1.5 3 6 12 | 39.2 37.4 37 37 | | | .094 |
| 2% Polymer 5% Benzyl Alcohol | | | .6 | 593 | .6 1.5 3 | 144 132.8 128.6 | .6 1.5 3 6 | 70 55.6 53.0 51.8 | 1.5 3 6 12 | 39.6 37 36 35.1 | 3 6 12 | 29 28.7 28.65 | | | .067 |
| 2% Polymer 10% Decanol | | | .6 | 463 | .6 1.5 3 | 143 138 136.8 | .6 1.5 3 6 | 63 56.8 56 56.5 | 1.5 3 6 | 44 42 40.6 | 3 6 | 32.6 32.7 | | | .095 |
| 1.5% Polymer 7.5% Decanol | | | 1.5 | 264.8 | 1.5 3 6 | 83.2 81.4 81 | 1.5 3 6 12 | 38 35.2 34.3 34 | 1.5 3 6 12 | 28.8 24.6 24.0 23.15 | 3 6 12 | 19 18.7 18.5 | | | 0.109 |
| 2% Polymer | | | .6 | 640 | .6 1.5 3 | 185 178.8 177.4 | 6 | 64 | 1.5 3 6 12 | 40 37.4 36.8 36.85 | 3 6 12 | 22.6 22.7 22.5 | | | .062 |
| 2% Polymer 10% Decanol | | | .6 | 552 | .6 1.5 3 | 150 146.8 146.6 | 3 6 | 56 55 | 3 6 12 | 33.4 32.6 32.3 | 3 6 12 | 19.2 19.2 19.0 | | | .064 |
| Shell Super X | .3 | 1180 | 1.5 | 245.6 | 1.5 3 6 | 78 76.4 76.7 | 1.5 3 6 12 | 32 30 29.9 29.8 | 3 6 12 30 | 19 18.3 18.1 18.2 | 3 6 12 30 | 12 12.5 12.35 12.5 | 6 12 30 | 9 8.65 8.5 | .077 |

Table G

SULFO-EPT (Na SALT, 0.58% S) IN SOLVENT 150N

| Sample | 0°C RPM | 0°C Viscosity | 25°C RPM | 25°C Viscosity | 50°C RPM | 50°C Viscosity | 80°C RPM | 80°C Viscosity | 100°C RPM | 100°C Viscosity | 120°C RPM | 120°C Viscosity | 135°C RPM | 135°C Viscosity | Ratio |
|---|---|---|---|---|---|---|---|---|---|---|---|---|---|---|---|
| 1.5% Polymer 3% Decanol | | | .6 1.5 | 387 369.6 | .6 1.5 3 | 152 139.2 137 | .6 1.5 3 6 | 114 94.8 92.4 92 | .6 1.5 3 6 | 94 90 87.6 86 | 1.5 3 6 | 74 68 66.8 | 1.5 3 6 | 66 63 62 | .243 |
| 1.5% polymer 4% Decanol | | | .6 1.5 | 357 338 | .6 1.5 3 | 130 117.2 113.6 | .6 1.5 3 6 | 70 59.2 58.8 58.8 | 1.5 3 6 12 | 51.6 50.4 50.2 49.75 | 1.5 3 6 12 | 47.2 46 45.7 44.85 | 3 6 12 | 44 43 42.55 | .153 |
| 1.5% Polymer 1.5% Benzyl Alcohol | | | .6 1.5 | 307 302 | .6 1.5 3 | 120 106 104.4 | .6 1.5 3 6 | 77 68 64 64 | 1.5 3 6 | 57.2 56.6 56.8 | 1.5 3 6 | 58.4 53 52 | | | .19 |
| Esso Extra 10W-20W-30 | 6 12 | 750 750 | 3 | 131.6 | 3 6 12 | 41.6 40.4 40.25 | 3 6 12 | 17 16.4 16 | 6 12 | 9.5 9.55 | 12 | 6.4 | | | .072 |
| Esso 20W-20 | 6 12 30 | 900 920 917 | 1.5 3 | 142.4 139.4 | 1.5 3 6 12 | 41.2 39 38.3 38.1 | 3 6 12 30 | 14.4 14 13.5 13.52 | 6 12 30 | 8.2 8.2 8.02 | 12 30 | 5.15 5.04 | | | .059 |

Table H

SULFO-EPT (Na SALT, 0.58% S) IN SOLVENT 100N

| Sample | 0°C RPM | Viscosity | 25°C RPM | Viscosity | 50°C RPM | Viscosity | 80°C RPM | Viscosity | 100°C RPM | Viscosity | 120°C RPM | Viscosity | Ratio |
|---|---|---|---|---|---|---|---|---|---|---|---|---|---|
| Solvent 100N | 1.5 | 140.8 | 1.5 | 37.6 | | | | | | | | | .10 |
| | 3 | 140 | 3 | 35 | 3 | 14 | | | | | | | |
| | | | 6 | 35.2 | 6 | 13.5 | 6 | 5.3 | | | | | |
| | | | 12 | 34.8 | 12 | 12.85 | 12 | 5.4 | 12 | 3.55 | 12 | 2.85 | |
| | | | | | 30 | 12.72 | 30 | 5.48 | 30 | 3.56 | 30 | 2.64 | |
| | | | | | | | 60 | 5.56 | 60 | 3.67 | 60 | 2.64 | |
| 1.75% Polymer | (Spindle No. 2) | | .3 | 450 | .3 | 182 | | | | | | | .305 |
| 4% Decanol | | | .6 | 410 | .6 | 160 | .6 | 115 | .6 | 125 | .6 | 110 | |
| | 1.5 | 1880 | 1.5 | 384.8 | 1.5 | 140 | 1.5 | 100 | 1.5 | 108.8 | 1.5 | 102.8 | |
| | 3 | 1780 | | | 3 | 137 | 3 | 96 | 3 | 102.6 | 3 | 101.4 | |
| | 6 | 1735 | | | | | 6 | 95.8 | | | 6 | 98.8 | |
| | 12 | 1680 | | | | | | | | | | | |
| 1.5% Polymer | (Spindle No. 2) | | .3 | 346 | .3 | 134 | | | | | | | |
| 3% Decanol | | | .6 | 325 | .6 | 126 | .6 | 99 | .6 | 90 | .6 | 76 | .28 |
| | 1.5 | 1440 | 1.5 | 310 | 1.5 | 121.6 | 1.5 | 90.8 | 1.5 | 84 | 1.5 | 68 | |
| | 3 | 1350 | | | 3 | 120.4 | 3 | 86.6 | 3 | 82 | 3 | 66.4 | |
| | 6 | 1310 | | | | | 6 | 84.5 | 6 | 81.5 | 6 | 66 | |
| | 12 | 1260 | | | | | | | | | | | |
| 1.5% Polymer | (Spindle No. 2) | | .3 | 640 | .3 | 394 | .3 | 332 | .3 | 240 | | | .38 |
| 1.5% Decanol | | | .6 | 570 | .6 | 364 | .6 | 290 | .6 | 232 | .6 | 173 | |
| | 1.5 | 2100 | | | 1.5 | 345.6 | 1.5 | 266.8 | 1.5 | 228 | 1.5 | 168.8 | |
| 1% Polymer | .3 | 672 | .3 | 254 | | | | | | | | | .14 |
| 1% Decanol | .6 | 650 | .6 | 233 | .6 | 105 | | | | | | | |
| | | | 1.5 | 213.6 | 1.5 | 90.4 | 1.5 | 48 | | | | | |
| | | | | | 3 | 81.6 | 3 | 42.6 | 3 | 30 | | | |
| | | | | | 6 | 74.5 | 6 | 36.8 | 6 | 25.2 | 6 | 16.4 | |
| | | | | | | | 12 | 33 | 12 | 21.5 | 12 | 14.4 | |
| | | | | | | | | | 30 | 18.66 | 30 | 12.5 | |
| 1.5% Polymer | .3 | 1040 | .3 | 310 | | | | | | | | | .21 |
| 3% Decanol | .6 | 969 | .6 | 285 | .6 | 110 | | | | | | | |
| | | | 1.5 | 256.8 | 1.5 | 92.8 | 1.5 | 56 | 1.5 | 53.6 | 1.5 | 43.6 | |
| | | | | | 3 | 91.2 | 3 | 54 | 3 | 49 | 3 | 40.6 | |
| | | | | | 6 | 89.6 | 6 | 52.2 | 6 | 47.7 | 6 | 40.2 | |
| | | | | | | | | | 12 | 47.75 | 12 | 39.35 | |

The following conclusions can be drawn from these data immediately:

1. In the case of Li, Na, Mg and DOTG salts dissolved in pure xylene (Tables A–D), the solution viscosity generally decreases monotonically as temperature increases. This is the normally accepted behavior. There are some subtle variations especially with sodium which arises from the gelled heterogeneous nature of the solutions.

2. In the case of Li, Na and Mg salts, when dissolved in hexanol/xylene mixed solvents, even at modest hexanol content (3%) it is observed that the solution viscosity actually increases as temperature increases. This is apparent over a broad temperature range and is clearly very exceptional behavior.

3. At higher hexanol contents (about 5%) the solution viscosity apparently goes through a minimum near 25° to 50°C. and then increases as temperature is increased from 0°C to 100°C.

4. At low hexanol levels (1%) the solution behavior is somewhat anomalous and as indicated, is somewhat erratic. Under these conditions at low alcohol contents with this system it appears that a truly homogeneous solution is not obtained and erratic values result. At 3% polymer concentration (containing approximately 20 milliequivalents of sulfonate per 100 gms of polymer) and 1% hexanol concentration, this amounts to about 15 moles of alcohol per mole of sulfonate. It has been determined that a minimum of about 10 moles of polar cosolvent per mole of metal sulfonate is required to result in the desired viscosity phenomenon of this invention. For example, at 5% hexanol (or approximately 75 moles, alcohol per mole of metal sulfonate) the desired viscosity behavior is obtained. Under these conditions the values obtained are significantly more reproducible.

The data obtained with the DOTG salt represent a viscosity-temperature behavior which obviously contrasts with that of the metal sulfonate systems. In the case of the amine derivative, the solution viscosity decreases monotonically with increasing temperature. It is suggested that this behavior is a consequence of the weaker interactions inherent in amine salts as contrasted to metal salts. As a result, the interaction between polar cosolvent and ionic species virtually wipes out ionic interactions at even modest cosolvent concentrations. In the metal sulfonate case the stronger ionic association can withstand the interaction with cosolvent such that there is maintained at all temperatures some ionic association. In this latter case, increase of the temperature serves to further promote ionic interaction and thereby increase the solution viscosity. Thus it is clear that amine or ammonium derivatives are not within the concepts of the present invention.

6. Finally as discussed above, behavior which displays the following may be obtained with this invention:

"Constant" over a temperature range from about 25°C. to about 100°C., i.e. the solution viscosity, as measured by techniques well known in the art (i.e. Brookfield viscosimeter), will not vary by more than a factor of 2 over the indicated temperature interval from its value at 25°C.;

Increase "substantially" over the temperature range of from 25°C. to almost 100°C. such that the value at 100°C. is at least twice the value observed at 20°C.;

In the case of more viscous hydrocarbons such as oils which normally display a viscosity decrease of at least 1 order of magnitude as temperature decreased from 25°C. to 100°C. (e.g. solvent 150N decreases from about 52 cps at 25°C. to about 5 cps at 100°C.), the viscosity behavior of this invention will reduce the magnitude of this viscosity decrease such that the ratio $$\frac{100°C.}{25°C.}$$

in the present invention will be substantially higher than that of the unmodified oil. For example, in the case of Solvent 150N, this ratio is about:

$$\frac{5 \text{ cps at } 100°C.}{52 \text{ cps at } 25°C.} = .096$$

The technology of the present invention permits this ratio to be at least 0.13, preferably about 0.2 and in some cases considerably higher. It is apparent that in certain practical applications this is tantamount to cutting very substantially the normal viscosity decrease which occurs as the temperature of oils is increased from 25°C. to 100°C.; and While the temperature interval from 25°C. to 100°C. is a convenient one to monitor and describe, it is not limiting. Indeed, we have demonstrated that this thickening behavior is manifested at much higher temperatures up to and above 150°C. In some cases it is possible to create at very high temperatures the viscosity will go through a slight maximum and then decrease. In most practical applications hydrocarbon viscosity control up to 150°C. is adequate.

What is claimed is:

1. A method for controlling the viscosity of a lubricating oil, said lubricating oil having a solubility parameter of from about 6.0 to about 10.5 and a viscosity of from 35 to 50,000 SUS at 100°F., which comprises incorporating in said lubricating oil an ionomeric polymer, said ionomeric polymer comprising a hydrocarbon backbone which is substantially soluble in said lubricating oil and from 0.2 to 10 mole % pendant ionic groups, said pendant ionic groups being selected from the group consisting of carboxylate, phosphonate and sulfonate groups, and said pendant ionic groups being neutralized to a degree of from 50 to 500 mole % with a basic material selected from Groups IA, IIA, IB, and IIB of the Periodic Table of the Elements and lead, tin and antimony, and polar cosolvent having a solubility parameter of from about 10 to 20, the solubility parameter of said polar solvent being at least 1.0 unit higher than the solubility parameter of said lubricating oil, and said polar cosolvent being soluble or miscible with said lubricating oil, wherein said ionomeric polymer is incorporated into said lubricating oil at a level of from 0.1 to 20 weight % of said lubricating oil, and said polar cosolvent being incorporated into said lubricating oil in an amount of from 10 to 600 moles per mole of pendant ionic group.

2. The method of claim 1 wherein said pendant ionic groups are sulfonate groups.

3. The method of claim 1 wherein said lubricating oil is a hydrocarbonaceous oil.

4. The method of claim 1 wherein said polar cosolvent comprises from about .1 to 40 weight percent of the total mixture of lubricating oil, ionomeric polymer and polar cosolvent.

5. The method of claim 4 wherein said polar cosolvent is selected from the group consisting of alcohols and amines.

6. The method of claim 5 wherein said polar cosolvent has a boiling point of at least 50°C.

7. The method of claim 2 wherein said ionomeric polymer is selected from the group consisting of sulfonated ethylene, sulfonated propylene, sulfonated ethylene-propylene copolymers and terpolymers wherein the third monomer is a nonconjugated diene hydrocarbon having from 5 to 15 carbon atoms and sulfonated polystyrene.

8. The method of claim 1 wherein said ionomeric polymer comprises from 0.5 to 5 mole % pendant ionic groups.

9. The method of claim 1 wherein said ionomer groups are neutralized to a degree of from about 90 to about 200%.

10. The method of claim 1 wherein said ionomer groups are neutralized to a degree of from about 100 to about 200%.

11. The method of claim 2 wherein said ionomeric polymer is sulfonated polystyrene.

12. The method of claim 2 wherein said ionomeric polymer is sulfonated polyethylene.

13. The method of claim 2 wherein said ionomeric polymer is sulfonated t-butylstyrene 14. The method of claim 2 wherein said ionomeric polymer is sulfonated polypropylene.

15. The method of claim 2 wherein said ionomeric polymer is sulfonated polyisobutylene.

16. The method of claim 2 wherein said ionomeric polymer is a sulfonated ethylene-propylene ethylidene norbornene terpolymer.

17. The method of claim 2 wherein said ionomeric polymer is a sulfonated polyisoprene.

18. The method of claim 3 wherein said ionomeric polymer is a sulfonated ethylene-propylene ethylidene norbornene terpolymer.

19. The method of claim 18 wherein said polar cosolvent is selected from the group consisting of hexanol, decanol and benzyl alcohol.

20. A composition of matter comprising a major amount of a lubricating oil having a solubility parameter of from 6.0 to 10.5 and a viscosity of 35 to 50,000 SUS at 100°F., and an ionomeric polymer, said ionomeric polymer comprising a hydrocarbon backbone which is substantially soluble in said lubricating oil and from 0.2 to 10 mole % pendant ionic groups, said pendant ionic groups being selected from the group consisting of carboxylate, phosphonate and sulfonate groups, and said pendant ionic groups being neutralized to a degree of from 50 to 500 mole % with a basic material selected from Groups IA, IIA, IB, and IIB of the Periodic Table of the Elements and lead, tin and antimony, and a polar cosolvent having a solubility parameter of from about 10 to 20, the solubility parameter of said polar solvent being at least 1.0 unit higher than the solubility parameter of said lubricating oil, said polar cosolvent being soluble or miscible with said lubricating oil, wherein said composition of matter comprises from 0.1 to 20 weight %, based on said lubricating oil, of said ionomeric polymer, and from 10 to 600 moles polar cosolvent per mole pendant ionic group.

21. The composition of claim 20 wherein said lubricating oil is a hydrocarbonaceous oil.

22. The composition of claim 20 wherein said polar cosolvent comprises from about 0.1 to 40 weight percent of the total mixture of lubricating oil, ionomeric polymer and polar cosolvent.

23. The composition of claim 20 wherein said polar cosolvent is selected from the group consisting of alcohols and amines.

24. The composition of claim 23 wherein said polar cosolvent has a boiling point of at least 50°C.

25. The composition of claim 20 wherein said pendant ionic groups are sulfonate groups.

26. The composition of claim 25 wherein said ionomeric polymer is selected from the group consisting of sulfonated ethylene, sulfonated propylene, sulfonated ethylene-propylene copolymers and terpolymers wherein the third monomer is a nonconjugated diene hydrocarbon having from 5 to 15 carbon atoms and sulfonated polystyrene.

27. The composition of claim 20 wherein said ionomeric polymer comprises from about 0.5 to about 5 mole % pendant ionic groups.

28. The composition of claim 20 wherein said ionomer groups are neutralized to a degree of from about 90 to about 200%.

29. The composition of claim 20 wherein said ionomer groups are neutralized to a degree of from about 100 to about 200%.

30. The composition of claim 20 wherein said ionomeric polymer is sulfonated polystyrene.

31. The composition of claim 20 wherein said ionomeric polymer is sulfonated polyethylene.

32. The composition of claim 20 wherein said ionomeric polymer is sulfonated t-butylstyrene.

33. The composition of claim 20 wherein said ionomeric polymer is sulfonated polypropylene.

34. The composition of claim 20 wherein said ionomeric polymer is sulfonated polyisobutylene.

35. The composition of claim 20 wherein said ionomeric polymer is a sulfonated ethylene-propylene ethylidene norbornene terpolymer.

36. The composition of claim 20 wherein said ionomeric polymer is a sulfonated polyisoprene.

37. The composition of claim 21 wherein said ionomeric polymer is a sulfonated ethylene-propylene ethylidene norbornene terpolymer.

38. The composition of claim 37 wherein said polar cosolvent is selected from the group consisting of hexanol, decanol and benzyl alcohol.

* * * * *